June 6, 1933.  F. R. BELT  1,912,682
ASH TRAY
Filed June 25, 1930
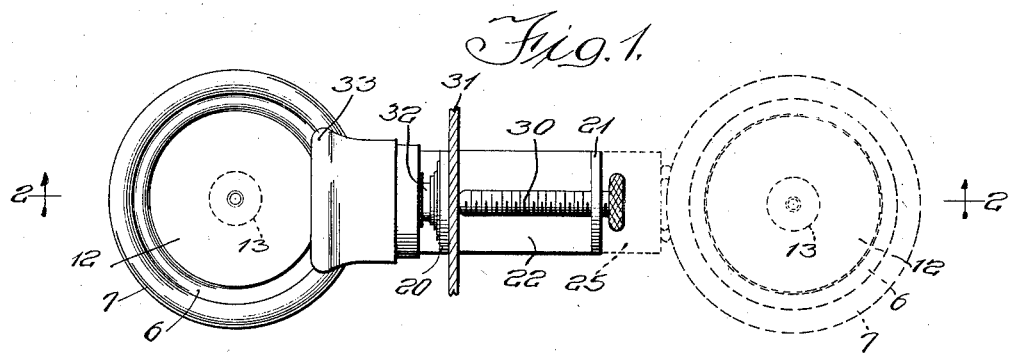
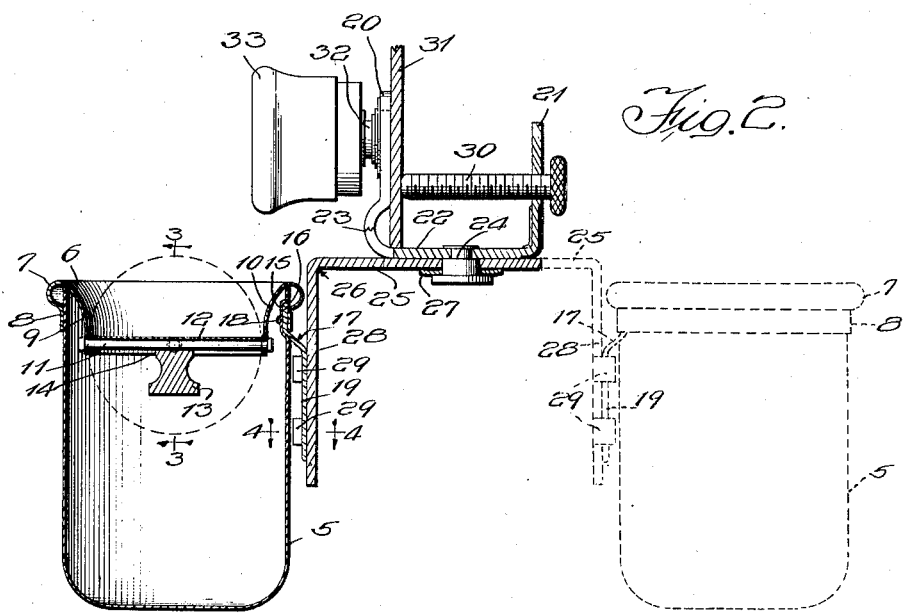
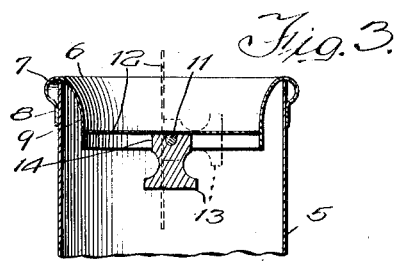
Inventor
Fred R. Belt
By Wm. O. Belt, Atty.
Witness:
William P. Kilroy Patented June 6, 1933

1,912,682

UNITED STATES PATENT OFFICE

FRED R. BELT, OF CHICAGO, ILLINOIS

ASH TRAY

Application filed June 25, 1930. Serial No. 463,621.

This invention relates to ash trays, more particularly to an ash tray adapted for use in an automobile or the like. Among the salient objects are to provide an ash tray which may be mounted on the instrument board or dash of an automobile or the like or at other analogous place; to provide an ash tray which may be moved into a concealed out of the way position when not in use; to provide an ash tray which will act to extinguish burning tobacco dropped thereinto, thus preventing smoke from being emitted from the tray; and to provide an ash tray which will be of simple and economical construction and easy to install.

A selected embodiment of the invention is illustrated in the accompanying drawing, and therein Fig. 1 is a plan view of my improved ash tray shown in association with the instrument board of an automobile which is fragmentally illustrated;

Fig. 2 is a side elevation of the tray shown in Fig. 1;

Fig. 3 is a vertical section taken substantially on the line 3—3 on Fig. 2;

Fig. 4 is a section taken substantially on the line 4—4 on Fig. 3.

Referring to the drawing, 5 indicates the body of the ash tray which in the present instance is in the form of a cylindrical body of greater height than diameter and which embodies an open upper end. At this open upper end is a cap 6 including a rounded upper bead portion 7 that terminates in a depending lip 8, which is adapted to be extended over the outer surface of the body 5 in snug fitting engagement therewith. The opposite end of the bead portion 7 terminates in an inwardly extending flange portion 9 which extends down into the cup in spaced relation with the walls of the body 5 providing what may be termed the smoke trap 10. Extending diametrically across the flange 9 is a rod 11, the ends of which extending beyond the flange 9 are flattened to prevent displacement thereof. Closing the opening defined by the lower edge of the flange 9 is a plate 12. A weight 13 is provided through the base portion 14 of which the rod 11 is extended, said weight 13 including a rivet or other securing portion which is extended through and connected to the plate 12 at the center thereof. Thus, the plate 12 is pivotally supported in position and by reason of the connection of the weight 13 at the center portion thereof and because of the extent of this weight away from the plate 12 it is apparent that the plate will normally be maintained in a horizontal position. However, when the plate is pivoted from the horizontal position the weight 13 will act thereon to pivot it back into horizontal position as soon as the force moving the plate from horizontal position is removed. An ash tray constructed in accordance with the foregoing may be used in any desired place, since it may be seated on the lower wall thereof.

However, as pointed out it is an object of this invention to provide an ash tray which may be used on an automobile and one which may be pivoted into an out of the way position when not in use. In order to accomplish this, the following arrangement is provided. Adjacent the upper edge of the body 5, the wall of the said body is dished inwardly as indicated at 15 in order that the foot portion 16 of the bracket, generally indicated by 17, may be disposed therein, said foot portion being retained in position by rivets 18 or other analogous securing devices. A tongue 19 is provided on the bracket 17 which is extended parallel to but spaced from the adjacent wall of the body 5, this tongue 19 being connected to the foot portion 16 by suitably curved portion of the bracket 17. A bracket embodying limbs 20 and 21 is provided, said limbs being interconnected by a portion 22 extended at right angles to the limbs 20 and 21, the limb 20 and the adjacent end of the portion 22 being connected by a suitably shaped portion 23. At substantially the mid-point of the portion 22 a rivet 24 is arranged, said rivet retaining the limb portion 25 of the bracket 26 in position, a spring washer 27 being disposed between the head of the rivet 24 and limb 25 of the bracket 26. The bracket 26 is preferably substantially L-shaped and at spaced points on the limb portion 28 thereof are unitary alined lugs 29, which lugs define a groove on the face of the limb portion 28 into which groove the tongue 19 may be extended and in this manner the body 5 is connected to the bracket including the limb portions 20 and 21. In the limb portion 21 a thumb screw 30 is mounted and this thumb screw is adapted to abut one face of the instrument board or the like 31, when the limb portion 20 is rested against the opposite face and in this manner, the structure may be mounted in position. When the body 5 is arranged to extend forwardly of the limb portion 20 it is in usable position, but when it is moved into the dotted line position of Fig. 2 it is manifest that it is out of the way. Thus, if the face of the board 31 against which the limb portion 20 is rested is deemed to be the face of the instrument board, it is apparent that the ash tray body 5 may be swung back behind the instrument board to not only be out of the way but also to be concealed.

On the limb portion 20 a stud 32 may be provided on which a lighter structure of approved form may be arranged, it being manifest that this arrangement is very advantageous since it permits a lighting structure and an ash tray to be supported by a single structure.

When it is desired to introduce a burning cigarette or the like into the ash tray, the plate 12 is pivoted from closing position about the circle shown by the dotted lines in Fig. 2 and therefore the cigarette may be dropped into the body 5, after which the weight 13 will pivot the plate in closing position. Smoke from the cigarette, if it has not been previously extinguished, will move up the sides of the body 5 and will be caught in the smoke trap 10 and in this manner objectionable smoke which frequently escapes from ash trays will be obviated since the smoke will not pass from the smoke trap 10 and move out past the plate 12.

While I have illustrated and described a selected embodiment of my invention, it is to be understood that this is capable of variation and modification when departing from the purview of my invention as set forth in the following claims:

I claim:

1. In an ash tray, a substantially cup shaped body having an open upper end, a cap including a depending flange adapted for snug engagement with the outer surface of the body adjacent said open upper end, said cap including an inwardly and downwardly extending flange portion projecting into the open end of said body and providing a smoke trap and having an opening at the lower end thereof, a rod extending diametrically across said opening and journaled in said flange, a weight member including a base having an opening therein in which said rod is secured, a plate, and means for connecting said plate to said weight member above said rod to pivotally support said plate in position to close said opening, said weight member acting to normally hold said plate in a normally horizontal position closing the opening.

2. In an ash tray, a substantially cup shaped body having an open upper end, a cap member including a depending flange having wedging engagement with the outer surface of said body adjacent the upper end thereof, said body being dished inwardly adjacent the upper end thereof, a bracket including a foot portion secured in the dished portion and having the outer face thereof substantially flush with the outer surface of the body to permit disposition of the flange thereover, a supporting member having portions thereon providing a groove, and a tongue on said bracket offset from said foot portion and adapted to be extended into said groove whereby said body is firmly and detachably connected to and carried by said supporting member.

FRED R. BELT.